United States Patent Office 2,911,375
Patented Nov. 3, 1959

2,911,375

PREPARATION OF PLATINUM CATALYSTS

John R. Coley, Gary, and Llewellyn Heard, Hammond, Ind., assignors to Standard Oil Company, Chicago, Ill., a corporation of Indiana No Drawing. Application September 17, 1956
Serial No. 610,378

2 Claims. (Cl. 252—466)

This invention relates to the preparation of platinum catalysts, and it pertains more particularly to a novel method of incorporating a noble metal, such as platinum or palladium, on an alumina base.

The object of our invention is to provide an improved method of applying platinum-on-alumina catalysts which are useful for effecting dehydrogenation and/or reforming of hydrocarbon oils, and particularly hydrocarbons of the gasoline boiling range. This is a continuation in part of application Serial Number 361,348, filed June 12, 1953, now U.S. Patent 2,853,435.

Our process is broadly suitable for the preparation of platinum-on-alumina hydroforming catalysts. Such catalysts ordinarily contain between about 0.1 and 1 percent by weight of platinum, preferably about 0.6 percent, supported on alumina, or on alumina plus a third component, such as a fluoride, a chloride, boria, titania, chromia, an oxide of phosphorus, vanadia, or the like. Such third components are commonly employed in the proportion of about 0.1 to 10 percent by weight, based on dry alumina.

In the preparation of such a catalyst, a mixture of platinum and alumina is prepared by commingling a Heard-type alumina hydrosol, described in Reissue Patent 22,196 (October 6, 1942), with a colloidal suspension of platinum sulfide, obtained by commingling aqueous solutions of chloroplatinic acid and ammonium polysulfide, and thereafter drying, calcining, crushing, forming into ⅛-inch pellets, again calcining, and subsequently activating by carrying out a naphtha hydroforming operation at 200 pounds per square inch gage, 2.0 volume hourly space velocity, 965° F. block temperature (the temperature of a heat-distributing metallic block surrounding the reaction zone), 930–935° F. average catalyst temperature, and 4,000–5,000 standard cubic feet of once-through hydrogen per barrel of charging stock. With a test naphtha boiling in the range of 200–360° F. and having a CFR–R octane number of 43.8, a hydroforming activity test on this catalyst under the stated conditions gave the following results:

| Product interval: | Octane number, CFR–R |
|---|---|
| 0–5 hours | 96.9 |
| 5–20 hours | 96.4 |
| 20–35 hours | 98.2 |
| 35–50 hours | 96.8 |
| 50–65 hours | 95.6 |
| 65–80 hours | 95.3 |
| 80–95 hours | 95.2 |
| 95–110 hours | 94.4 |

A "Heard-type" alumina sol is one prepared in the manner described in Heard Reissue Patent 22,196, i.e., by amalgamating metallic aluminum with a small (catalytic) quantity of mercury and converting to an alumina sol by the action of water slightly acidulated with acetic acid. The precise method of making such a sol is set forth in detail in Reissue Patent 22,196. In the foregoing example of catalyst preparation, an amount of platinum sulfide was added to the Heard-type alumina sol to give 0.6 weight percent platinum based on dry alumina.

As another example of our catalyst preparation technique, a platinum-on-alumina catalyst was prepared by first making a Heard-type alumina sol by treating aluminum metal with a dilute acetic acid in the presence of a small (catalytic) quantity of mercury as described in Reissue Patent 22,196. About 30 grams of platinum chloride were added to 12 liters of said sol containing about 330 grams of alumina on a dry basis. After thorough mixing, about 1600 cc. of ammonium formate was added as a setting agent. The setting of the platinum-containing sol required about two hours and by the time the catalyst had set, black spots were visible throughout; this resulted from reduction of the chloride to platinum black. After drying, the catalyst was calcined in air and then activated by treatment with hydrogen. Such hydrogen activation is usually effected by treating the catalyst with hydrogen at a temperature in the range of about 500° to 1100° F., preferably about 850° to 1,000° F. at a pressure in the range of atmospheric from 350 p.s.i.g. or more, and for a time of about 0.1 to 10 hours or more. In this second example, the catalyst was activated by treatment with hydrogen in the absence of charging stock, while in the first example, the activation was effected during the first twenty hours' hydroforming step itself.

One part of the catalyst, prepared as described in the second example, was employed for effecting dehydrogenation of gas oil at 300° C., the gas oil charge having been previously treated to remove all components except paraffin and cycloparaffin components and 0.03 weight percent sulfur. Another portion of said catalyst was successfully employed to dehydrogenate cyclohexane. The catalyst previously employed for dehydrogenating gas oil was less effective for dehydrogenating cyclohexane, apparently because it was poisoned by the sulfur contained in the gas oil charge.

While two examples of our invention have been described, it should be understood that the invention is not limited thereto. As pointed out in Heard Reissue Patent 22,196, the sol may be gelled with a wide variety of gelling agents and any desired metal may be incorporated in the alumina sol before gelation. Obviously, palladium may be thus incorporated in the same manner as above described for incorporating platinum (as distinguished from the impregnation of a solid carrier as described in U.S. 2,440,673). The platinum chloride-alumina mixture may be treated with hydrogen sulfide (U.S. 1,935,-188) but treatment with an aqueous solution of ammonium sulfide as described in Heard et al. 2,659,701 is the preferred technique.

We claim:

1. A process for manufacturing platinum-on-alumina catalyst which comprises preparing an alumina hydrosol by treating aluminum metal with a dilute acid in the presence of catalytic amounts of mercury, mixing a platinum compound with said alumina hydrosol, drying and calcining the resultant product, and treating the calcined mixture with hydrogen to activate the same.

2. A process for manufacturing platinum-on-alumina catalyst which comprises preparing an alumina hydrosol by treating aluminum metal with a dilute acid in the presence of catalytic amounts of mercury, mixing a platinum compound with said alumina hydrosol, treating this mixture with an aqueous solution of ammonium sulfide, drying and calcining the resultant product, and treating the calcined mixture with hydrogen to activate the same.

References Cited in the file of this patent

UNITED STATES PATENTS

| Re. 22,196 | Heard | Nov. 28, 1947 |
| 2,479,109 | Haensel | Aug. 16, 1949 |
| 2,746,937 | Hunter et al. | May 22, 1956 |